(No Model.)
G. H. RICHARDS.
FLUSH WASHER FOR PHOTOGRAPHIC PURPOSES.
No. 440,325. Patented Nov. 11, 1890.
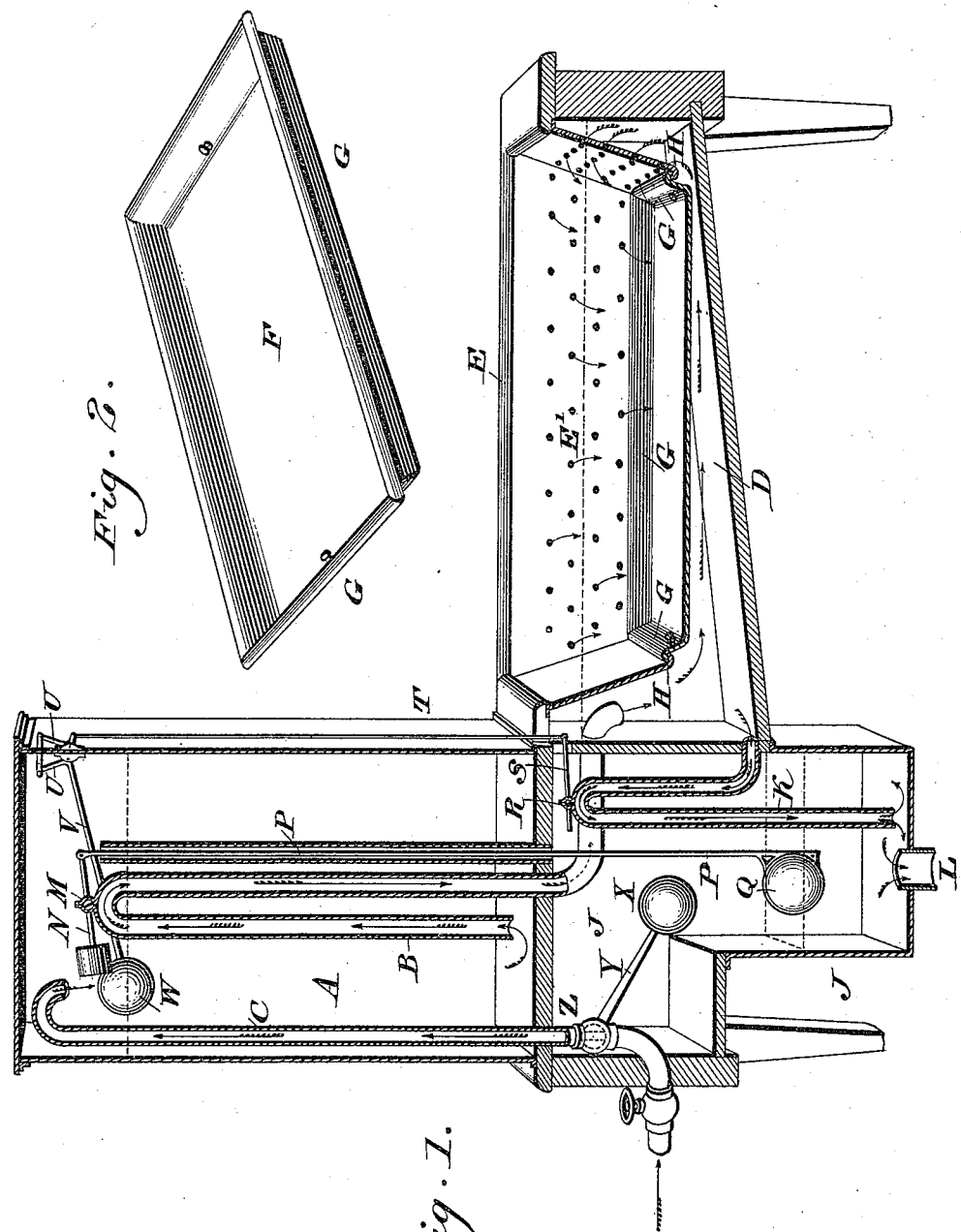
WITNESSES:
P. H. Nagle.
L. Douville.
INVENTOR
George H. Richards.
BY John A. Guedersheim
ATTORNEY.

United States Patent Office.

GEORGE H. RICHARDS, OF PHILADELPHIA, PENNSYLVANIA, ASSIGNOR OF ONE-HALF TO WILLIAM NUNEVILLER, OF SAME PLACE.

FLUSH-WASHER FOR PHOTOGRAPHIC PURPOSES.

SPECIFICATION forming part of Letters Patent No. 440,325, dated November 11, 1890.

Application filed January 11, 1890. Serial No. 336,662. (No model.)

*To all whom it may concern:*

Be it known that I, GEORGE H. RICHARDS, a citizen of the United States, residing in the city and county of Philadelphia, State of Pennsylvania, have invented a new and useful Improvement in Flush-Washers for Photographic Purposes, which improvement is fully set forth in the following specification and accompanying drawings.

My invention consists of a flush-washer for photographic purposes in which the tank containing the print-washer may be siphoned only when the flush-tank is full.

It also consists in having the flush-tank siphon when the print-washer tank is empty.

It also consists of means for entirely shutting off the supply of water should the waste become clogged.

It also consists of the construction of the print-washer whereby matting of the prints is prevented.

Figure 1 represents a vertical section, in perspective, of a flush-washer for photographic purposes embodying my invention. Fig. 2 represents a perspective view of the removable bottom of the print-washing basin.

Similar letters of reference indicate corresponding parts in the two figures.

Referring to the drawings, A designates the flush-tank of the apparatus, the same containing the siphon B, and the supply-pipe C, the latter serving to direct running water into said tank A.

D designates a tank containing the print-washing basin E, which has perforated sides and ends E' and an imperforate and removable bottom F, the latter having its rim sustained on a flange H at the lower portion of the sides and ends of the basin. The long limb of the siphon B enters the tank D, so as to discharge thereinto.

Below the tank A is the waste-tank J, which contains a siphon K, whose short limb opens into the tank D for discharging the latter of water therein, the long limb of said siphon opening into the tank J.

L designates the discharge-pipe of the tank J, whereby the waste water admitted thereinto may be directed elsewhere, as desired.

The siphon B is provided with an air-cock M, whose weighted stem N is connected by a rod P with a float Q, the latter being located in the lower portion of the waste-tank J.

The siphon K is provided with an air-cock R, whose stem S is connected by a rod T, and elbow-levers U with the rod V of the float W, the latter occupying the upper portion of the tank A.

Within the tank J is a float X, whose stem Y is connected with the cock Z of the supply-pipe C, whereby should the pipe L clog and water rises in the tank J the float is elevated and closes the cock Z, thus cutting off the supply of water to the apparatus.

The operation is as follows: Water is admitted into the tank A by the pipe C and fills the same. This raises the float W, whereby the air-cock R is closed and the siphon K is operative. The siphon B is open, and water flushes or flows through the same from the tank A into the tank D and enters the basin E, whereby the prints are subjected to the washing action of the running water, the closed bottom F of said basin keeping full of water, whereby matting of the prints is prevented, and said bottom may be removed and carried elsewhere while the water remains therein. The waste water is siphoned from the tank D into the tank J, and escapes therefrom through the pipe I. Should the float W fall, due to the emptying of the tank A, the air-cock R is opened, thus destroying the action of the siphon K. Should the tank D become empty, the tank A being full, the float Q falls, thus closing the air-cock M and causing action of the siphon B, so that the tank A is properly supplied or filled.

Having thus described my invention, what I claim as new, and desire to secure by Letters Patent, is—

1. A supply-pipe, in combination with a flush-tank and a washing-tank, which are connected by a siphon, and a waste-tank, which is connected by a siphon with said washing-tank, substantially as and for the purpose set forth.

2. The connecting-siphons of the flush, washing, and waste tanks, provided with air-cocks, in combination with floats attached to said cocks and located, respectively, in the flush and waste tanks, substantially as and for the purpose set forth.

3. In a flush-washer for photographic purposes, tanks provided with siphons, in combination with air-cocks, which are connected with said siphons and automatically opened to affect the action of the siphons, substantially as and for the purpose set forth.

4. In a flush-washer for photographic purposes, a flush-tank and a supply-pipe connected therewith, and a siphon in said tank, in combination with a washing-tank, which is in communication with the flush-tank by means of said siphon, substantially as and for the purpose set forth.

5. A print-washing basin having perforated walls and a removable imperforate bottom, substantially as described.

6. In a photographic flush-washer, a flush-tank, a supply-pipe connected therewith, and a waste-tank provided with a float, said supply-pipe having a cock, which is connected with said float, whereby the supply may be automatically cut off, substantially as and for the purpose set forth.

GEORGE H. RICHARDS.

Witnesses:
JOHN A. WIEDERSHEIM,
A. P. JENNINGS.